Oct. 20, 1964  P. PROFOS  3,153,620
NUCLEAR REACTOR PLANT
Filed Aug. 21, 1961
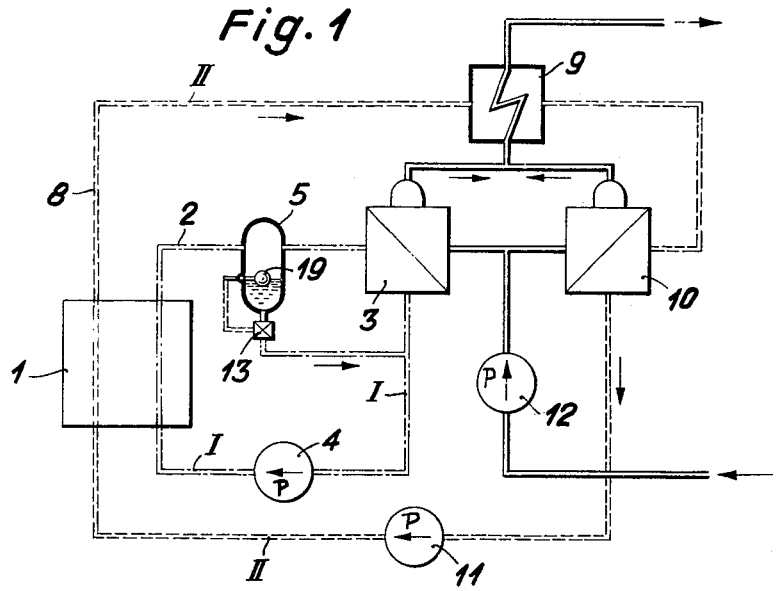
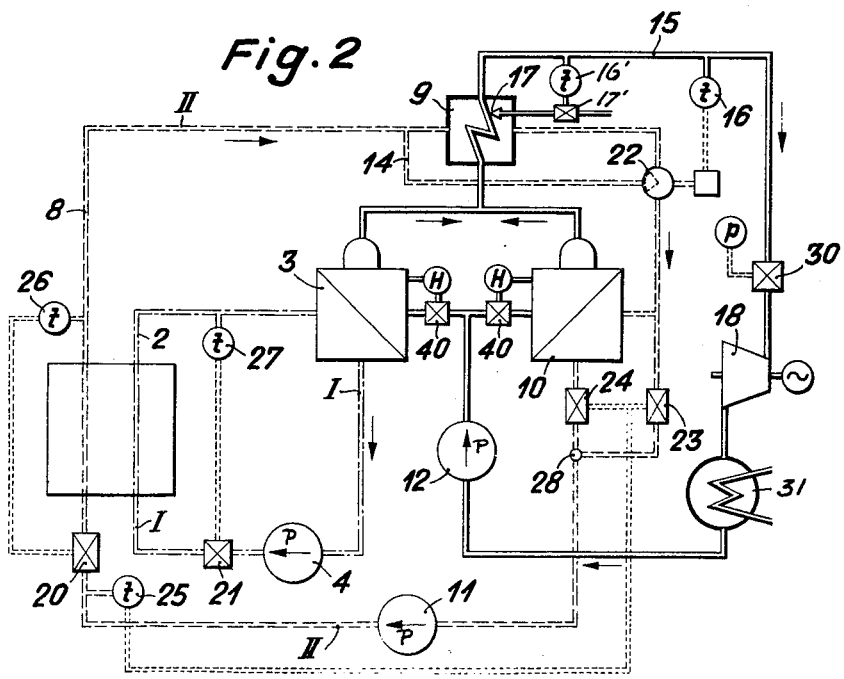
Inventor:
PAUL PROFOS.
By K. A. Mayr
Attorney.

3,153,620
NUCLEAR REACTOR PLANT
Paul Profos, Winterthur, Switzerland, assignor to Sulzer Freres, S.A., Winterthur, Switzerland, a corporation of Switzerland
Filed Aug. 21, 1961, Ser. No. 132,877
Claims priority, application Switzerland Aug. 29, 1960
7 Claims. (Cl. 176—51)

To remove the heat generated in a nuclear reactor a liquid or gaseous medium must be used which yields the heat received to a heat engine either directly or through a secondary circuit. To obtain maximum plant efficiency, the temperature at which the operating medium enters the heat engine must be as high as possible. The maximum permissible temperature, however, is limited by the temperature resistance of the materials used in the reactor. In pressure water and boiling water reactors it is difficult to make full use of the limited temperature range permitted by the construction materials of the reactor, because the pressure in the reactor vessel is very high and a very costly reactor tank must therefore be provided. To avoid this difficulty, the coolant is conducted through relatively small bore tubes which are embedded in or surround the fissionable material. The neutron absorption of the material forming the cooling tubes causes neutron losses which may be reduced by using materials, such as zirconium alloy, which have a very low neutron absorption cross-section. To reduce the pressure resistance requirements it has been proposed to use two separate circuits to transfer the reactor heat to the operating medium, the two circuits operating at different pressures and temperatures. The same heat carrier is used in the two circuits and the heat engine is arranged in one of the two circuits.

According to the invention two separate primary circuits of two different heat carriers are provided for removing the heat generated in the reactor which is transferred from the two primary circuits to a common secondary circuit of an evaporable operating medium. The heat exchange conditions in the reactor core are preferably so chosen that the heat carrier of the first primary circuit leaves the reactor at a temperature $T_1$ and the heat carrier of the second primary circuit leaves the reactor at a temperature $T_2 > T_1$, the heat carrier having the exit temperature $T_1$ being used to evaporate the operating medium, while the heat carrier having the exit temperature $T_2$ yields at least some of its heat available in the temperature range between $T_2$ and $T_1$ to a superheater for the operating medium.

The particular advantage of a plant according to the invention is that the use of two separate primary circuits makes it possible to use a wider range of heat carriers and more particularly to select the same to suit reactor physics; also, the use of a secondary circuit avoids radioactive contamination of the turbine. Consequently, a medium having a low vapor pressure can be used, for instance, in the circuit effecting final superheating of the operating medium, so that in spite of the relatively high temperatures which are necessary, the parts conveying such medium need not be particularly pressure-resistant.

Other features and advantages of the invention will become apparent from the following description of embodiments of the invention with reference to the drawing wherein:

FIG. 1 is a diagrammatic illustration of the basic circuits of a plant according to the invention.

FIG. 2 is a diagrammatic illustration of a modified plant according to the invention including controls therefor.

In the plant shown in FIG. 1 a heat carrier forming a first circuit I—shown in dash-dotted lines—is heated in a reactor 1, passes through a pipe 2 to an evaporator 3 for an operating medium, and is returned to the reactor by a pump 4. In a second circuit II—shown in dotted lines—a heat carrier which has been heated in the reactor 1 flows through a pipe 8 into a superheater 9, and is then returned by a pump 11 through an auxiliary evaporator 10 to the reactor. The auxiliary evaporator 10 can be omitted if the extent to which the superheater 9 cools the heat carrier is such that the heat carrier is sufficiently cooled to re-enter the reactor at the required temperature. If the heat carrier issuing from the reactor is in the mixed phase state, a liquid separator 5 is provided in the pipe 2. If required, a similar device can be provided to separate the liquid phase in the pipe 8. The return of the liquid which accumulates in the separator 5 can be controlled by a valve 13 which is controlled by a float 19.

The operating medium, preferably water, is conveyed in the liquid state by a pump 12 into the evaporators 3 and 10, is evaporated therein, superheated in the heat exchanger 9 and then supplied to a consumer.

The heat carrier which flows in the primary circuit II is mainly intended to superheat the operating medium, and the particular conditions can always be so arranged that a smaller quantity of heat, but at a higher temperature, is transferred in circuit II than in circuit I. If, therefore, heat carriers having substantially the same vapor pressure-temperature pattern are used in the two circuits I and II, only circuit II must withstand higher pressure. Within the reactor the vehicle of circuit II is therefore preferably conveyed through relatively small diameter tubes embedded in the fissionable material. The lower pressure medium in circuit I can be conducted, for instance, through tubes which surround individual fuel rods or a number of combined fuel rods. In a modification of the apparatus according to the invention the heat carriers of the two circuits flow through pressure pipes of equal configuration forming two groups, the fissionable material elements in a central part of the reactor core being associated with one group and the fissionable material elements in the surrounding peripheral part being associated with the second group. Preferably, the pressure tubes in the central zone are interposed in the primary circuit I, while the pressure tubes in the peripheral zone are interposed in the circuit II. This arrangement takes care of the fact that the outer fuel rods deliver less heat than the inner fuel rods which heat can be removed at a smaller difference between the surface temperature of the fuel rods and the coolant, so that circuit II can be operated at a higher temperature than the circuit I.

The two heat carriers are supplied to the reactor preferably in the liquid state. Whether they leave the reactor in the liquid or gaseous state can be determined independently for the two circuits by appropriate adjustment of the pressures. Hereby the choice of heat carriers, the amount of heat to be transferred, and the maximum permissible pressure in each of the circuits are, of course, important. Since at least portions of the heat carriers are present in liquid form in the reactor core, heat carriers having satisfactory moderating effects are preferred. For instance, heavy water may be used in one circuit and ordinary water may be used in the second circuit. The heavy water may form all or part of the moderator, and good heat transfer characteristics can be achieved by fitting baffles in the reactor which guide the moderator liquid on a predetermined path along the fuel rods. A solid moderator substance, such as graphite, may be used in combination with the liquid moderator, in which case the fuel rods would be disposed in channels in the moderator. In an arrangement of this type the vehicle of the lower pressure circuit may, for instance, pass through an annular chamber between the fissionable material and the graphite.

Particularly favorable results are obtained if the heat carrier of circuit II is a substance which, at given temperatures, has a much lower vapor pressure than water. Organic substances from the group of the polyphenyls are preferred. Disphenyl, for instance, has a vapor pressure of only 5 atmospheres at a temperature of 340° C. and also has a good moderating characteristic. If used in circuit II, it may form all or part of the reactor moderator. Since it can easily be arranged that only a minor part of the total useful heat produced must be removed by the circuit II, the relatively low heat transfer coefficients and relatively low specific heat of organic substances have no undesired effect.

In the plant shown in FIG. 2 one heat carrier, such as light or heavy water, flows in primary circuit I, while a heat carrier having a much higher evaporation temperature, for instance, diphenyl, flows in circuit II. The circuit II heat carrier which has been heated in the reactor flows through the heat exchanger 9, and superheats the saturated steam delivered by the evaporators 3 and 10. A portion of the heat carrier flowing through the pipe 8 which is regulated by a distributing valve 22, bypasses the superheater 9 by way of a bypass pipe 14. The distributing valve 22 is controlled by a temperature responsive device 16 connected to a pipe 15 conducting the steam superheated in the superheater 9 to a turbine 18. The device 16 maintains a predetermined temperature of the live steam which temperature may be adjusted from outside the plant. The temperature of the superheated steam can also be controlled by injection of liquid operating medium at 17 into the steam passing through the superheater, the rate of supply of coolant being regulated by a valve 17' which is controlled by a device 16' which is responsive to the temperature $t$ of the superheated steam in the pipe 15. A valve 30 maintains a constant pressure $p$ in the pipe 15 upstream of the turbine 18. The portions of heat carrier medium flowing through the superheater 9 and through the bypass pipe 14 are recombined in the distributing valve 22. Some of the combined heat carrier passes through the auxiliary evaporator 10 and a valve 24, while the remainder of the heat carrier flows through a valve 23 and bypasses the auxiliary evaporator 10. The rate of flow of heat carrier medium from the valve 22 through the evaporator 10 and bypassing the evaporator may be controlled by appropriate adjustment of the two valves 23, 24; such adjustment can either be manual or automatic preferably by means of a device 25 sensing the temperature $t$ of the medium of circuit II as it enters the reactor. In lieu of the two valves 23 and 24 a single valve similar to the valve 22 can be provided at the junction 28 and controlled in dependence upon the temperature at which the heat carrier enters the reactor. Temperature sensitive devices 26, 27 provided in the primary circuits II and I at the outlets of the reactor control valves 20 and 21, respectively, for regulating the flow through the reactor so as to maintain predetermined temperatures at the reactor outlets. Volume-compensating tanks, not shown, are provided in each of the three circuits in the conventional manner. The levels of the operating medium in the evaporators 3 and 10 are maintained by valves 40 disposed in the water inlets of the evaporators and controlled by conventional water level controls H. A pump 4 maintains circulation in the circuit I. A pump 11 maintains circulation in the circuit II, and a pump 12 pumps the operating medium which has been condensed in a condenser 31 into the evaporators 3 and 10.

Clearly many variants are possible within the scope of the invention, more particularly with regard to the passage of the heat carriers in the reactor core and to the choice of heat carriers for the two primary circuits. Other advantageous combinations can be made because the moderator can be used for heat transfer in either one or the other of the two primary circuits.

If use of the moderator heat in one of the primary circuits is not wanted or is not possible, because the temperature of the moderator liquid is too low, the moderator liquid may be used in a special recooling circuit, for instance, for feed water preheating.

I claim:

1. A vapor generating plant comprising:
    a nuclear reactor,
    first conduit means conducting a first reactor coolant,
    said first conduit means forming a first circuit having a portion extending through said reactor for heating said first coolant,
    second conduit means conducting a second reactor coolant which is different from said first coolant,
    said second conduit means forming a second circuit having a portion extending through said reactor for heating said second coolant to a temperature higher than the temperature to which said first coolant is heated in said reactor,
    third conduit means conducting a vaporizable operating medium,
    two evaporators interposed in said third conduit means,
    said first conduit means extending through one of said evaporators for indirectly heating and evaporating the operating medium therein, and
    a superheater interposed in said third conduit means downstream of said evaporators,
    said second conduit means extending consecutively through said superheater and through the second evaporator for indirectly heating and superheating the operating medium in said superheater and for thereupon indirectly heating and evaporating the operating medium in said second evaporator.

2. A vapor generating plant as defined in claim 1 wherein said evaporators are arranged in parallel relation with respect to the flow of the operating medium passing therethrough.

3. A vapor generating plant as defined in claim 1 wherein said second conduit means includes a valved bypass conduit bypassing said superheater for regulating the flow rate of said second reactor coolant through said superheater.

4. A vapor generating plant as defined in claim 1 wherein said second conduit means includes a valved bypass conduit bypassing said second evaporator for regulating the flow rate of said second reactor coolant through said second evaporator.

5. A vapor generating plant as defined in claim 1 wherein one of said reactor coolants is heavy water and the other of said reactor coolants is normal water.

6. A vapor generating plant as defined in claim 1 wherein said second reactor coolant is an organic substance suitable to act as a moderator.

7. A vapor generating plant as defined in claim 1 wherein said second reactor coolant is diphenyl.

References Cited in the file of this patent

FOREIGN PATENTS

| 841,920   | Great Britain | July 20, 1960 |
| 1,040,713 | Germany       | Oct. 9, 1958  |